United States Patent [19]

Trumpy

[11] 4,282,944
[45] Aug. 11, 1981

[54] WIND POWER SYSTEM

[76] Inventor: J. Walter Trumpy, 14820 Sunset Blvd., Pacific Palisades, Calif. 90272

[21] Appl. No.: 41,488

[22] Filed: May 22, 1979

[51] Int. Cl.³ .............................................. B60L 11/18
[52] U.S. Cl. .............................. 180/2 A; 180/65 DD; 416/17; 416/119
[58] Field of Search ................... 416/17, 119, 111, 46; 415/2; 180/2 A, 65 DD, 7 P, 165; 115/3

[56] References Cited

U.S. PATENT DOCUMENTS

| 146,548 | 1/1874 | Perry | 416/119 |
|---|---|---|---|
| 256,234 | 4/1882 | McClintock | 416/119 |
| 641,143 | 1/1900 | O'Toole | 416/240 A |
| 1,413,861 | 4/1922 | McDowell | 416/142 B |
| 1,844,796 | 2/1932 | Royak | 416/111 |
| 1,973,290 | 9/1934 | Leon | 416/111 |
| 2,247,929 | 7/1941 | Terhune | 416/46 |
| 2,603,300 | 7/1952 | King | 416/111 |
| 3,876,925 | 4/1975 | Stoeckert | 180/2 A |

FOREIGN PATENT DOCUMENTS

| 505764 | 8/1920 | France | 416/17 |
|---|---|---|---|
| 633558 | 1/1928 | France | 416/119 |
| 925160 | 8/1947 | France | 416/17 |
| 362722 | 9/1938 | Italy | 416/17 |

Primary Examiner—Joseph F. Peters, Jr.
Assistant Examiner—Donn McGiehan
Attorney, Agent, or Firm—Poms, Smith, Lande & Rose

[57] ABSTRACT

A wind motor includes three vanes mounted to rotate about a vertically oriented main shaft, and the three vanes are also mounted to rotate about individual axes which are equidistant from the main shaft and extend parallel to it. Through the use of cranks connected to each vane, and a simple triangular linkage interconnecting the cranks, the three vanes rotate together so that, as the wind impinges on the system, all three vanes cooperate to aid in rotation of the assembly around the main shaft. A collapsible unit includes arrangements for unfolding the vanes as the main shaft is raised into operating position. The wind motor is preferably located in an area where winds are funnelled at relatively high velocity to impinge on the wind motor. The vanes of the wind motor are oriented by a cog belt or a sliding rod, for optimum angular orientation with the wind, and arrangements are provided for holding the vane control assembly in this optimum orientation.

15 Claims, 6 Drawing Figures

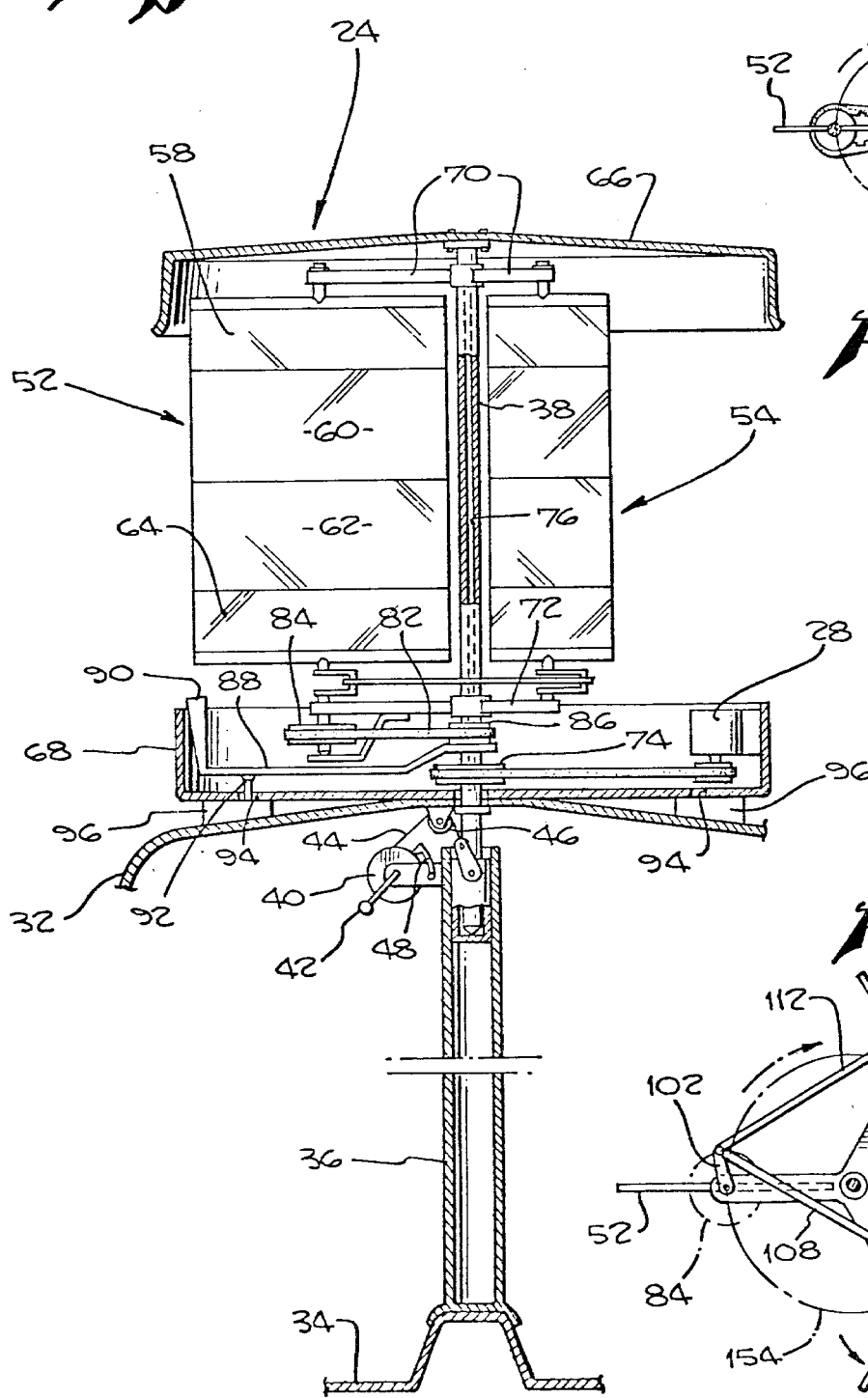
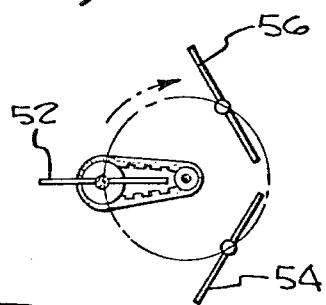
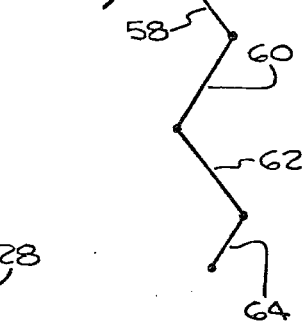
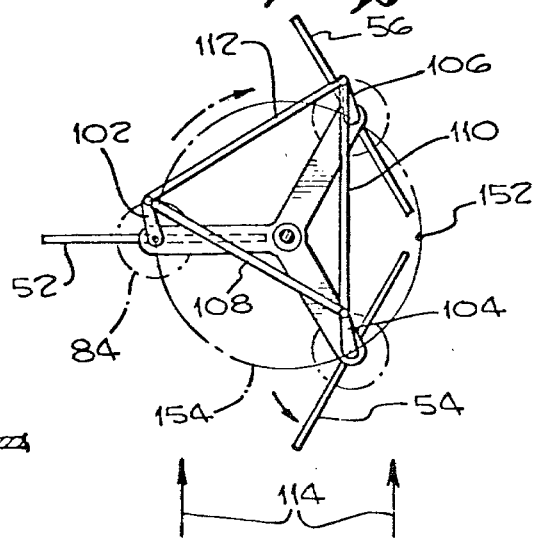

WIND POWER SYSTEM

FIELD OF THE INVENTION

This invention relates to improved wind motors, often referred to as windmills.

BACKGROUND OF THE INVENTION

Wind motors have previously been proposed in which an assembly of several vanes rotates about a vertically oriented main shaft, with the additional vanes being disposed around the main shaft. Typical patents of this type include the following: T. O. Perry, U.S. Pat. Nos. 146,458, granted Jan. 20, 1874; F. McClintock, 256,234, patented Apr. 11, 1882; L. Royak, 1,844,796, granted Feb. 9, 1932, and G. Leon, 1,973,290, granted Sept. 11, 1934; C. F. Terhune, 2,247,929, granted July 1, 1941, and C. F. Terhune, 2,406,268, granted Aug. 20, 1946. These vertical axes, flat vane, wind energy converters date back to the last century and are so elaborate and complicated that they are rarely mentioned in current literature on the subject. One source of complication is the gearing or chains employed to rotatet each vane. Much additional needless complication of the early designs involve the inclusion of mechanical regulators to limit centrifugal forces during high winds. This idea was a carry-over from experience with radial vane systems which tend to self-destruct from centrifugal force in high winds. Propeller units, for example, often have tip speeds five or ten times greater than the wind velocity. However, speed regulation is not needed to protect flat vane vertical axis units because the vanes do not move faster than the wind. Calculations indicate that wind motor units of the present type will operate safely in winds over 100 miles per hour.

Most of the early patents show tail vanes, a feature which also indicates a misconception of the actual operation of the units. This is another carry-over from the inherently balanced radial vane systems which all used tail vanes to direct them into the wind. In the case of vertical axis flat vane wind converters, in the order of 60% of the torque tending to rotate the entire units about the central axis occurs on one side of the machine. Accordingly, even with a moderately large tail, the units will tend to shift in the order of 45 degrees or more from the optimum orientation relative to the wind, thereby decreasing the efficiency by a substantial factor, often in excess of 50%.

Most of the early arrangements used four, and some suggested using more than four vanes. However, the arrangements used by these early inventors for synchronously rotating the vanes were exceedingly complex and inefficient.

Accordingly, a principal object of the present invention is to provide an improved and simplified vertical axis flat vane type wind energy converter. A collateral object of the present invention is to provide a simple wind motor which may be employed to re-charge the automobile batteries of an electric car while the car is parked, either at night, or during the day while the owner is not using the car.

SUMMARY OF THE INVENTION

In accordance with one aspect of the invention, a vertical axis flat vane wind energy converter employs only three vanes, and each of these vanes is provided with a crank, fixedly secured to the vane, and secured by a simple triangular mechanical linkage to the cranks on the two other vanes. This simple rigid triangular mechanical linkage serves to rotate the three vanes together in a manner which avoids much of the complexity and frictional problems inherent in prior designs.

One of the three vanes may be used as the master control vane, and its angular position relative to the main shaft is controlled in any desired manner, for example by a cog belt, or by a sliding rod arrangement as disclosed hereinbelow.

In accordance with a broad aspect of the invention, the angular position of the vanes of a wind motor of the present type are preferably controlled in two steps and only two steps.

First all vanes are made to rotate in unison by means of a crank at each vane with all cranks linked by one solid piece, or by a rigid member or linkage. Second, any one of the vanes can now be controlled by a cogged belt, or similar functional setup, and the other vanes will follow it.

A wind powered system for an electrical car include a collapsible vertical axis flat vane wind energy converter. The central or main rotatable shaft of the wind motor may be raised from a normal position in which it is substantially within the automobile or other vehicle, to a raised position in which it extends above the roof of the car. Simultaneously with the raising of the main shaft, the vanes are extended to the operative position exposed to the wind. An enclosing housing serves to mount the assembly on the roof in a compact configuration when the car is being driven, and serves to mount the orientation control and the electrical generating equipment for the system. The output from the generator is connected through circuitry including a diode to charge the batteries, and thus only couples to charge the battery when the wind is blowing at a sufficient velocity.

The wind motor is preferably located in a location where substantially prevailing winds are to be expected. Additional wall type structures may be provided to funnel the wind toward the wind motor, and alternatively, the wind motors may be mounted in physical locations where the natural terrain and/or man-made structures will concentrate the wind.

A very significant advantage of the present wind motor is its relatively slow speed, which enables it to operate at very high wind velocities. Since wind power varies as the cube of wind velocity, when wind speed is doubled, for example, output power is increased 8 times.

Another aspect of the invention involves the elimination of speed governors, and the use only of automatic load controls to reduce the speed of the wind motor for optimum energy conversion.

In accordance with another feature of the invention, the wind motors are not provided with conventional tails, which have generally proved to be ineffective or inoperative, but are oriented in precisely the optimum direction for the wind, and are either clamped in position, or are automatically shifted to point toward a separately sensed wind direction.

Other objects, features and advantages of the present invention will become apparent from a consideration of the following detailed description and from the accompanying drawings.

BRIEF DESCRIPTION OF THE DRAWINGS:

FIG. 2 is an enlarged partial cross-sectional view showing the collapsible wind motor for automotive use in its operative configuration;

FIG. 2A is a diagram showing the mode of collapsing of the vanes of FIG. 2;

FIG. 3 is a schematic view showing the relative position of the three vanes and the cog belt;

FIG. 4 is a schematic showing of the cranks and the triangular linkage which interconnects the cranks in the arrangements of FIGS. 2 and 5;

DETAILED DESCRIPTION

Figure 1:
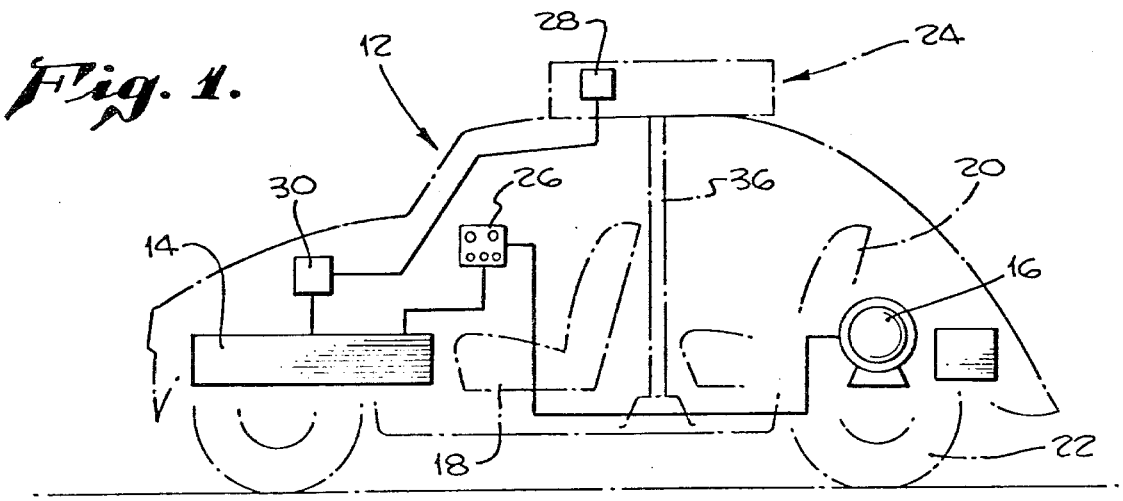
FIG. 1 shows an electric powered automobile equipped with a wind motor generator.

Referring more particularly to the drawing, FIG. 1 shows an electric car 12 which is provided with a storage battery compartment 14, and an electric motor 16 mounted to the rear of the seats 18, 20, for driving the rear wheels 22. On top of the roof of the automobile 12 is the wind motor 24 in its collapsed or stored position. With regard to electrical controls, the driver controls the application of power from the batteries 14 to the electric motor 16 by a control unit 26 which may be both foot and hand operated, by controls which may be similar to those employed in conventional gas power automobiles. The generator 28 associated with the wind motor 24 supplies power to the set of batteries 14, through suitable control circuitry 30 which includes, for example, rectifying circuitry to insure transmission of current only from the generator to the battery set, and to prevent discharge of the batteries when the generator 28 is not being operated. Control circuit 30 may include suitable regulation circuitry to supply increased charging current from generator 28 under strong operating wind conditions, and to stop further charging when the battery unit 14 is fully charged. The details of the electric car configuration are not disclosed, as such cars have been operated on an experimental basis, and their principles of operation are well known.

FIG. 2 shows the construction of the wind motor 24 when it is shifted from the inoperative or stowed condition shown in FIG. 1 to the operative configuration. In FIG. 2 the roof of the car 12 is shown at 32, and the floor of the car is indicated at 34. A hollow tube 36 normally holds the main shaft 38 of the wind motor when the unit is in the stowed configuration. However, the small winch 40 is operated with the handle 42 to pull the main shaft 38 up to its operative position through the use of a cable 44 extending over a pulley 46 which maybe secured to the roof of the car or alternatively to the top of the tube 36. The main shaft 38 is held in its raised position by any suitable arrangements such as the detent 48.

Three foldable wind vanes 52, 54 and 56 are provided, and these are oriented relative to one another as indicated more clearly in the schematic showings of FIGS. 3 and 4. Referring back to FIGS. 2, and 2A, the wind vane 52 is formed of several foldable sections 58, 60, 62 and 64. These sections are pivoted as indicated by the lines between them and as shown schematically in FIG. 2A, and fold down flat when the upper shell member 66 is lowered to mate with the lower casing section 68 and enclose the wind motor for storage during driving, for example. Secured to and rotatable on the main shaft 38 are the upper vane supporting trimount 70 and the upper housing 66. The lower tri-mount 72 and the power pulley 74 rotate with the main shaft 58, and are keyed to the slot 76 which runs for most of the length of the main shaft 38 so that the lower tri-mount 72 and the power pulley 74 may remain within the housings 66 and 68, when the main shaft 38 is lowered into the tube 36. A cog belt 82 extends between two cog wheels 84 and 86, which have a two-to-one ratio. The inner small cog wheel 86 does not rotate with the main shaft 38, but is merely journaled to rotate on it. The cog wheel 86 is fixedly secured to the arm 88 which may be moved to any desired angular orientation by the handle 90 and fixed in its angular position by the detent 92 which can be secured in any one of a large number of circumferentially positioned openings 94.

The rubber mounting members 96 support the lower housing 68 on the roof 32 of the car and restrain the entire unit against undue vibration.

Concerning the control of the orientation of the vanes 52, 54, and 56, as the shaft 38 and its two associated tri-mounts 70 and 72 rotate, this vane action is controlled by the three cranks 102, 104 and 106 together with the three braces 108, 110 and 112 which together form a rigid triangular linkage. The cog wheel 84 is rigidly connected to the crank 102 and forces the vane 52 to rotate as the two tri-mounts 70 and 72 rotate along with the main shaft 38. As the tri-mount 72 rotates, under the force of wind travelling in the direction indicated by the arrows 114, the next successive vane 54 will be moved to the position indicated by vane 52 in FIG. 4, following one-third of a rotation of the main shaft. Similarly the vane 56 will assume the position shown in FIG. 4 by the vane 54, and vane 52 will take the place of vane 56. In this way, the vanes will always be oriented so as to maximize the clockwise torque applied to the tri-mounts 70 and 72 and to the main shaft 38.

Under normal conditions, the user of the electric car of FIG. 1 would park it in a windy location such as on the roof of the parking structure, while he or she is at work. Then, the winch handle 42 would be turned to raise the main shaft to the position indicated in FIG. 2, and the handle 90 would be oriented to maximize the wind force being applied to the unit. The generator 28 receives power from the power pulley 74, and supplies electricity to charge the batteries 14, thereby providing sufficient energy to drive the electric car 12, particularly when it is only used for commuting purposes. Of course, each owner would have available to him either within the car or in another convenient location, charging equipment for restoring the power level of the batteries 14, in the event the batteries are not maintained at the desired charge level by the wind power unit. Normally prior to driving the vehicle, the detent 48 would be released, and the winch 42 operated to lower the main shaft 38, and the equipment supported on it. As the tri-mount 70 is lowered, the portions 58, 60, 62 and 64 of the wind vane fold, accordion fashion, as shown in FIG. 2A (are) and stored within the casing 66, 68.

Figure 5:
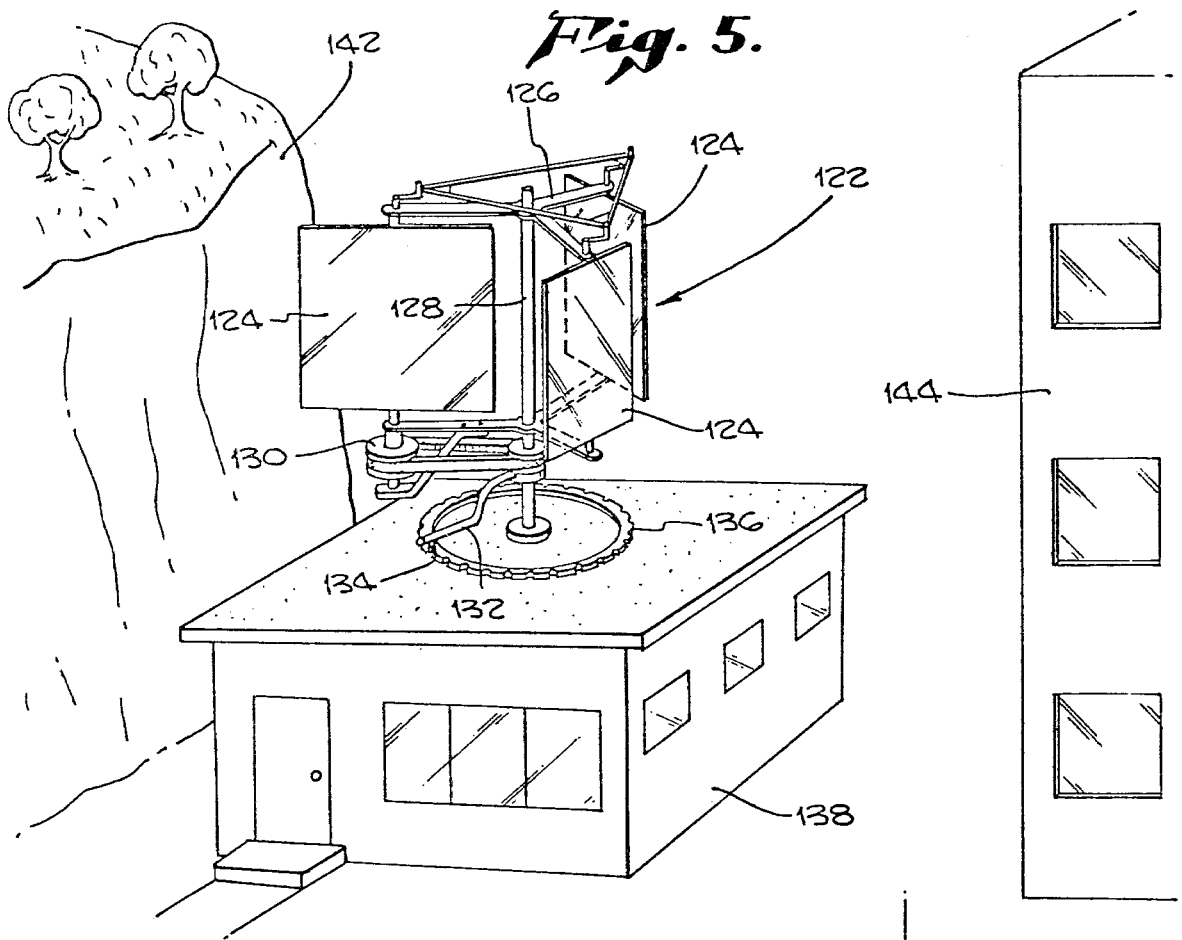
FIG. 5 shows a large scale embodiment of the invention.

Now referring to FIG. 5, a larger size wind power unit 122 is provided, and it has three vanes 124 which may each be in the order of 30 feet by 30 feet, by way of specific example. In the arrangement of FIG. 5, the cranks and the rigid triangular linkage interconnecting the cranks are mounted above the upper tri-mount 126, which rotates with the central main shaft 128 of the structure. The cog gear arrangement 130 is substantially the same as that shown in the smaller scale version of FIG. 2. However, the orientation arm 132 is provided with a clamping mechanism 134 which may be secured in recesses in outer periphery of the circular track 136. The weight of the visible portion of the structure is supported by an end bearing set into the floor of the block house 138. A second bearing at roof level, provide lateral support for the shaft. Suitable power generation and power utilization or power storage equipment is located within the blockhouse 138.

As schematically indicated in FIG. 5, a cliff 142 may be located on one side of the wind motor 122, and a structure or building 144 on the other side of it. Particularly in areas where winds that tend to be funnelled through narrow spaces such as that indicated in FIG. 5, often running from west to east, steady strong winds may be present. Such locations are particularly advantageous for wind motors such as those of the present invention.

Figure 6:
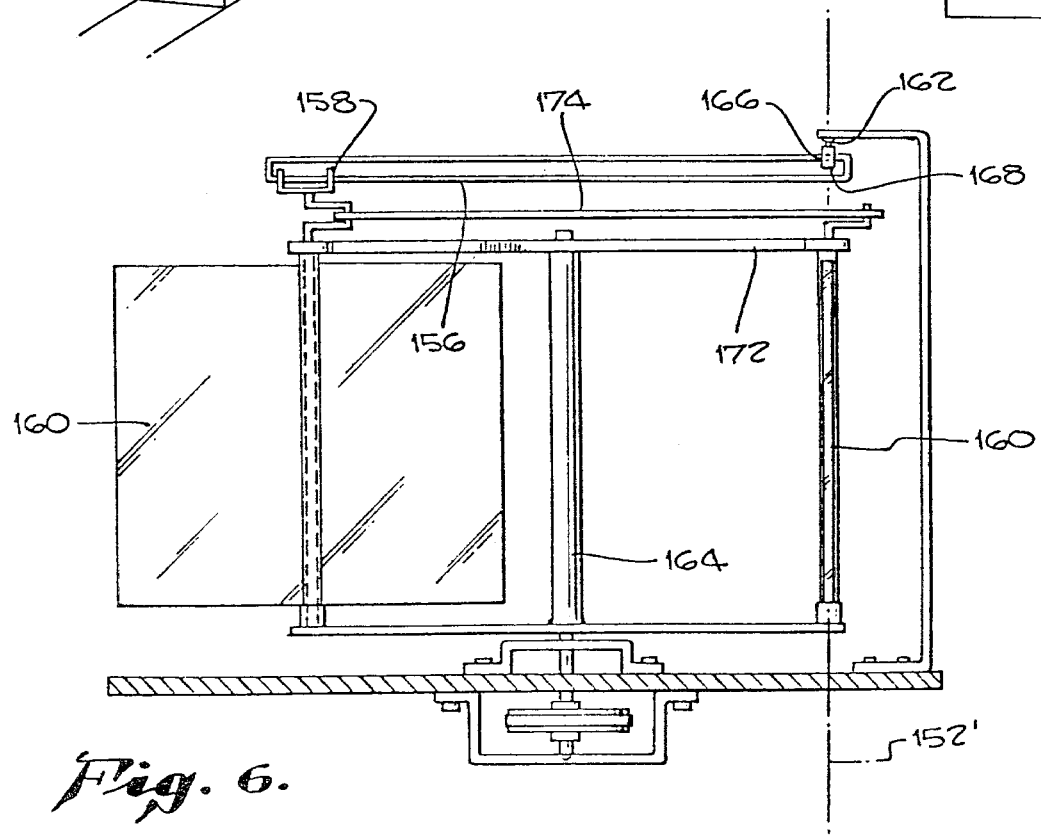
FIG. 6 shows an alternate arrangement for maintaining the proper orientation of the vanes as the assembly rotates.

In connection with FIG. 6, an alternative arrangement for controlling the orientation of the master vane, for substitution for the cog wheel arrangement will be described. By way of preamble, attention is directed to FIG. 4, and the fact that, as the vanes rotate they always keep pointing to a single point 152 on the circle 154 (more precisely, to a single line 152 on the cylinder 154) describing the locus of the pivoting axes of the vanes. Accordingly, if one of the vanes, which will be designated the master vane, could be maintained pointing toward point 152, as the vane rotated, and if the other two vanes were held by the triangular bracing in their proper orientation, then the proper orientation of all three vanes would be maintained at all times.

The master control rod assembly including the double sliding rod 156 and the bracket 158 rigidly secured to rotate with the master vane 160, serves to accomplish the foregoing function, in combination with the pivot point assembly 162. The pivot point assembly 162 is located at the same radial distance from the main shaft 164 as the vane axes, essentially corresponding to point 152 in FIG. 4. The double sliding rod 156 passes through an opening 166 in the pivotal member 168. With the arrangement as shown, as the vane 160 rotates about the main shaft 164, the bracket 158 slides on the lower portion of the double rod assembly 156, and the upper portion of the assembly 156 slides through the opening 166. The result is to maintain the orientation of the master vane 160 always pointing toward a single point, such as 152 as shown in FIG. 4 (axis 152 in FIG. 6). Incidentally, the bracket 158 slides past pivot point assembly 168 at point 152, and travels to the other end of the double sliding rod assembly 156, during successive rotations.

It may also be noted that a trimount assembly 172 and a triangular linkage 174 are provided to perform the same functions as in other embodiments discussed hereinabove. Also, to re-orient the unit of FIG. 6 for changes in wind direction, the pivot point 168, and axis 152' must be shifted.

Figure 7:
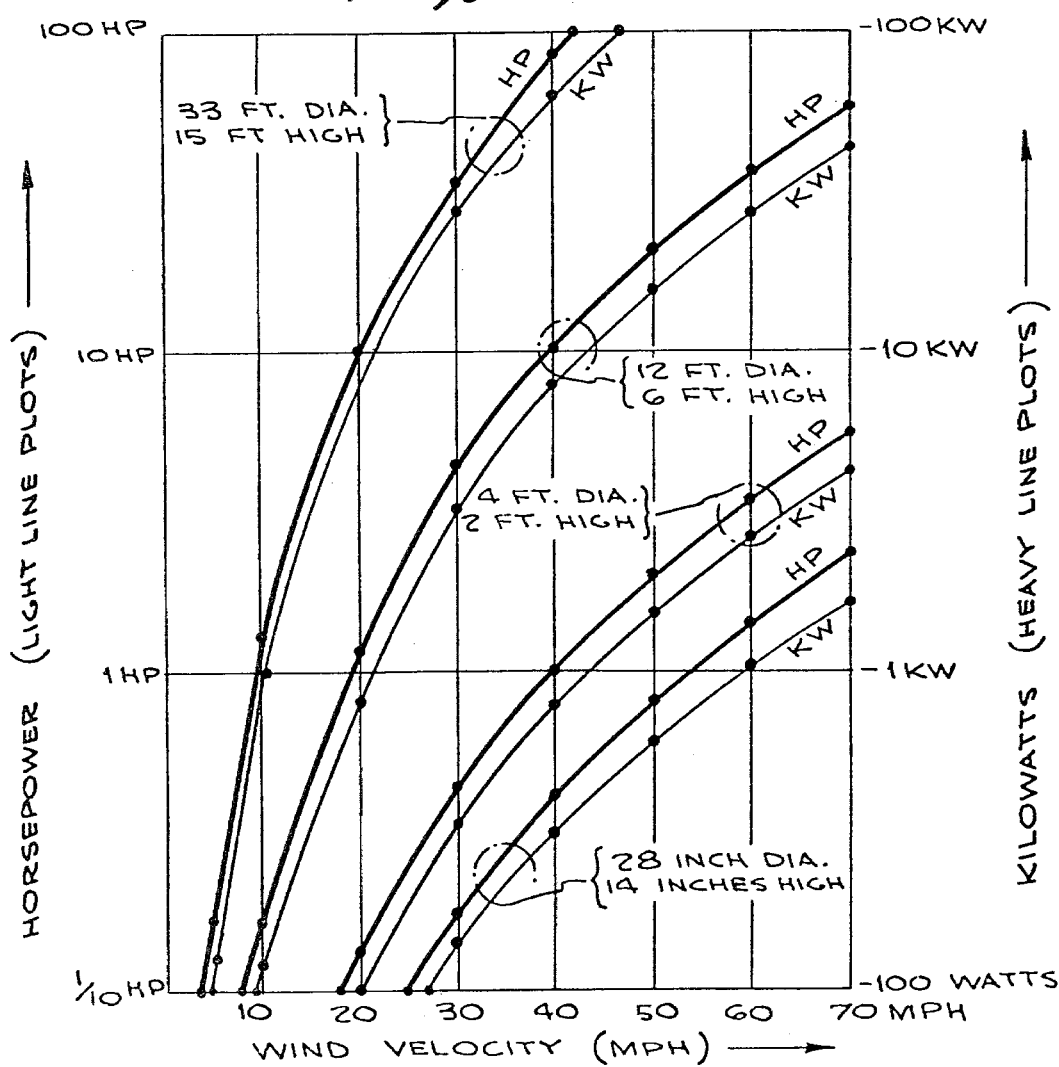
FIG. 7 is a diagram indicating the power output for wind motors of the present invention plotted against wind velocity.

FIG. 7 is a rough plot of horsepower and kilowatts versus wind velocity for several different sizes of wind motors. The plot of FIG. 7 was calculated for wind motors having four vanes, instead of the three vanes disclosed herein; however, the figures as shown in FIG. 7 can be readily converted to the three vane models disclosed herein by multiplying the horsepower and kilowatt figures by a factor of about 80%. The power figures shown in FIG. 7 are gross figures, so that in practice the net power output must be reduced by frictional and resistance losses to obtain net electrical output of figures.

Now that the detailed description has been completed, a few generalized statements may be made. Specifically, relative to the number of vanes, a three vane wind motor would have a power output which is more than 70% of what a six or more vane unit would have; accordingly, the three vane units are greatly to be preferred because of the simplicity of the structure and the small number of moving parts which are involved. Additional power is easily obtained by increasing the size of the vanes, which is more economical than increasing the number of vanes. Rectangular vanes are generally preferred, but the shape may be either high and narrow, or low and wide, as departures from the square configuration. High profile units can be fitted between adjacent buildings, and low profile units are less obtrusive when aesthetic considerations become important.

Concerning the orientation of the vanes, it is important that, for maximum efficiency, the vane be perpendicular to the direction of the wind when the axis of the vane is on a line through the center of the main shaft of the wind motor, and extending perpendicular to the direction of the wind. As discussed hereinabove this orientation may be obtained by moving the handle 90 in the arrangement of FIG. 2, and by moving the arm 132 is the larger arrangement of FIG. 5. As discussed in detail in the introduction to the present specification, the usual tails which have been proposed previously for this type of arrangement will not accomplish the desired result, because of the unbalanced torque provided by the vanes on opposite sides of the main shaft. In fact, when applicant originally sought to use a unit with a substantial size tail, the unit pivoted around until it reached a neutral position where it was not generating any power, and was not rotating. Instead of the positive locking arrangements disclosed in the present application, other sophisticated techniques could be employed for orienting the wind motors of the present invention. For example, a servo motor actuated by a signal from a small reference vane could be used to automatically correct vane orientation for changes in wind direction, thus assuring optimum power output at all times.

With regard to orientation arrangements, those of C. A. King shown in U.S. Pat. No. 2,603,300 are interesting in the use of two vanes, a big vane referred to as a "directional" vane, and a small vane referred to as a "governing" vane. The "directional" and "governing" vanes are in addition to the normal set of vanes which receive the force of the wind and generate power. In operation, when the wind changes, the position of the governing vane, in the King system, shifts, de-energizing one electromagnet and energizing a different one. The big directional vane is then supposed to swing around under the force of the wind and then be held in place by the newly energized electromagnet. Unfortunately, for the reasons discussed above, once the directional vane is released, the force of the wind will tend to shift the vanes to a neutral position, and fifty percent of the time this will not be in the direction for engagement with the newly energized electromagnet, in the case of the embodiment of FIGS. 1 and 2 of King. Again, this shows a lack of understanding of the unbalanced forces which tend to rotate wind motors of this type. Instead of the tail configurations shown in the patents, wind motors of the present type must be positively oriented properly with respect to the wind and held there by a locking device, or by servo-mechanism providing positive control throughout the 360 degree angular movement of the control member which orients the vanes.

Incidentally, the theoretical advantages of the flat vane system described herein are not generally understood, and this would appear to be true even in the case of the inventors listed in some of the patents mentioned hereinabove. This is clearly indicated by the addition of the damping or centrifugal speed limiting systems which have complicated many of the prior proposals of the present type. More specifically, wind will exert maximum force against a flat surface that is perpendicular to it. Any curving of a given surface or positioning the surface at an angle other than normal to the wind will reduce the force against that surface. Although a small sailboat can go faster than the wind when its sail is set at an angle, maximum speed is not equivalent to maximum energy. A heavily loaded barge with a small sail will move fastest in a downwind direction when its sail is perpendicular to the wind. Note that square-rigged clipper ships were the most efficient wind powered carriers of heavy ocean cargoes. The present wind motor design uses the same direct push of the wind. Other inherent advantages are that the vanes cover most of the "window area" which results in an efficient compact machine, and the rectangular profile of the unit makes it practical to increase the power output many times, by using stationary walls to funnel more wind through the motor, or by locating the motor where pre-existing natural or previously constructed buildings have concentrated the wind force.

As mentioned hereinabove, the three vane embodiment is to be preferred over other embodiments with more vanes, for simplicity. Incidentally, in the diagrammatic showing of FIG. 4, only two vanes are shown, in opposite positions, to keep the showing simple. The preferred three vane, and other vane arrangements could be implemented using the sliding rod arrangements of FIG. 4 to control the orientation of the master vane.

In closing, it is emphasized that the present invention is not limited to that precisely as disclosed herein. Thus, by way of example and not of limitation, variations in the specific mechanical arrangements for implementing the various indicated functions may be employed. Thus, instead of using folding collapsible vanes, as shown in FIG. 2, fabric or other flexible vanes which are stretched when the unit is placed in operation could be employed; and instead of a cogged belt, sprockets and a bicycle-type chain could be used. Other similar or comparable changes in the structure could be utilized.

What is claimed is:

1. A wind motor comprising:
a central vertically extending rotatable main shaft;
three generally rectangular vanes;
means for mounting said vanes equidistant around said shaft to rotate both about separate axes parallel to the axis of said vertical shaft and also to rotate together about said shaft;
means including cranks secured to rotate with each vane and linkages rigidly interconnecting said cranks in a triangular configuration, for rotating said vanes in unison; and
means for orienting each of said vanes to be perpendicular to the incident wind when the axis of each said vane is at a point on a line extending through said main shaft and also extending perpendicular to the direction of the incident wind, said orienting means including means for fully restraining against the unbalanced forces applied to said system when it is in the optimum orientation relative to the wind as defined hereinabove.

2. A wind motor system as defined in claim 1 further comprising:
an automobile;
means for mounting said wind motor on the roof of said automobile;
means including an electric motor for driving said automobile;
means including batteries for supplying electricity to said electric motor; and
means for charging said batteries from said wind motor.

3. A wind motor installation as defined in claim 1 further comprising:
means for funnelling or directing wind toward said wind motor.

4. A wind motor as defined in claim 1 wherein additional means are provided for fixing said orienting means against movement.

5. A wind motor system as defined in claim 1 wherein said orienting means includes a cog belt and cog wheels mounted on one of said vanes and on said main shaft and having a two to one cog ratio.

6. A wind motor as defined in claim 1 further comprising:
a useful load coupled to said main shaft; and
means for reducing the speed of rotation of said main shaft; and, apart from undesired frictional losses in bearings and the like, said means for reducing the speed of rotation consists solely of the useful load coupled to said main shaft.

7. A collapsible wind motor assembly comprising:
a central vertically extending rotatable main shaft;
a plurality of vanes;
means for mounting said vanes equidistant around said shaft to rotate both about separate axes parallel to said vertical shaft and also to rotate together about said shaft;
means for rotating said vanes in unison;
means for orienting each of said vanes to be perpendicular to the incident wind when the axis of each said vane is at a point on a line extending through said main shaft and also extending perpendicular to the direction of the incident wind;
means for raising and lowering said main shaft between a stored position and an operative position, respectively; and
means for exposing said vanes in an operative position and for lowering said vanes into a compact configuration with a vertical extent less than one-half of their operative configuration, concurrently with the raising and lowering, respectively, of said shaft.

8. A wind motor system as defined in claim 7 further comprising:
means for mounting said collapsible wind motor assembly on a vehicle; and
means for powering said vehicle from said wind motor assembly.

9. A wind motor system as defined in claim 7 further comprising:
an automobile;
means for mounting said collapsible wind motor assembly on the roof of said automobile;

an electric motor for driving said automobile;
batteries for providing electricity for said electric motor; and
means for charging said batteries from said collapsible wind motor assembly.

10. A wind motor system as defined in claim 9 further comprising a cover for said collapsible wind motor assembly secured to the upper end of said main shaft.

11. A collapsible wind motor assembly as defined in claim 7 further comprising upper and lower mating casings, said upper casing being mounted on said main shaft, and means for mounting said lower casing on the roof of an automobile.

12. A wind motor assembly comprising:
a central vertically extending rotatable main shaft;
a plurality of vanes;
means for mounting said vanes equidistant around said shaft to rotate both about separate axes parallel to said vertical shaft and also to rotate together about said shaft;
means for rotating said vanes in unison;
means for orienting each of said vanes to be perpendicular to the incident wind when the axis of each said vane is at a point on a line extending through said main shaft and also extending perpendicular to the direction of the incident wind, said orienting means including means for fully restraining against the unbalanced forces applied to said system when it is in the optimum orientation relative to the wind as defined hereinabove;
a useful load coupled to said main shaft; and
said assembly including means for reducing the speed of rotation of said main shaft; and apart from undesired frictional losses in bearings and the like, said means for reducing the speed of rotation consists solely of the useful load.

13. A wind motor as defined in claim 12 wherein additional means are provided for fixing said orienting means against movement.

14. A wind motor as defined in claim 12 wherein said plurality of vanes are precisely three vanes and wherein said means for rotating said vanes in unison includes a rigid triangular linkage, and cranks connected to the center of each of said three vanes.

15. A wind motor comprising:
a central vertically extending rotatable main shaft;
a plurality of generally rectangular vanes;
means for mounting said vanes equidistant around said shaft to rotate both about separate axes parallel to the axis of said vertical shaft and also to rotate together about said shaft;
means for positively controlling and orienting a first one and only one of said vanes to be perpendicular to the incident wind when the axis of said one vane is at a point on a line extending through said main shaft and also extending perpendicular to the direction of the incident wind, said controlling and orienting means including means for fully restraining against the unbalanced forces applied to said system when it is in the optimum orientation relative to the wind as defined hereinabove and
means consisting solely of cranks secured to rotate with each vane and a rigid member interconnecting said cranks in a triangular configuration, for rotating said other vanes in unison with said first vane.

* * * * *